US012781544B2

(12) United States Patent
Yu et al.

(10) Patent No.: US 12,781,544 B2
(45) Date of Patent: Nov. 3, 2026

(54) ACTUATOR, DOOR LOCK ASSEMBLY, AND VEHICLE

(71) Applicant: BYD COMPANY LIMITED, Shenzhen (CN)

(72) Inventors: Guobin Yu, Shenzhen (CN); Rongjian Liang, Shenzhen (CN); Xianlin Nong, Shenzhen (CN); Shigui Qin, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 24 days.

(21) Appl. No.: 18/829,943

(22) Filed: Sep. 10, 2024

(65) Prior Publication Data

US 2024/0426145 A1 Dec. 26, 2024

Related U.S. Application Data

(63) Continuation of application No. PCT/CN2023/094846, filed on May 17, 2023.

(30) Foreign Application Priority Data

May 31, 2022 (CN) ......................... 202210615548.1

(51) Int. Cl.
*E05B 81/06* (2014.01)
*E05B 77/34* (2014.01)
*E05B 79/20* (2014.01)

(52) U.S. Cl.
CPC .............. *E05B 81/06* (2013.01); *E05B 77/34* (2013.01); *E05B 79/20* (2013.01)

(58) Field of Classification Search
CPC .......... E05B 81/06; E05B 77/34; E05B 79/20; E05B 81/34
See application file for complete search history.

(56) References Cited

U.S. PATENT DOCUMENTS

2017/0321456 A1 11/2017 Jeong
2025/0333986 A1* 10/2025 Cetnar .................... E05B 81/36

FOREIGN PATENT DOCUMENTS

CN 108301707 A 7/2018
CN 110029888 A 7/2019
(Continued)

OTHER PUBLICATIONS

Examination Report No. 1 dated Aug. 12, 2025, issued in Australian Patent Application No. 2023278276 (4 pages).
(Continued)

*Primary Examiner* — Terence Boes
(74) *Attorney, Agent, or Firm* — Sheppard Mullin Richter & Hampton LLP

(57) ABSTRACT

An actuator includes: a housing having a cable outlet, a driver, an output rotor, a first cable and a second cable. The driver is disposed inside the housing. The output rotor is configured to be driven to rotate forward or backward by the driver, and has a fitting part. A first end of the first cable and a first end of the second cable fit to the fitting part, and a second end of the first cable and a second end of the second cable extend out of the housing through the cable outlet. The output rotor is configured to rotate forward to drive the first cable through the fitting part, and is configured to rotate backward to drive the second cable through the fitting part.

8 Claims, 8 Drawing Sheets

(56) References Cited

FOREIGN PATENT DOCUMENTS

| | | | |
|---|---|---|---|
| CN | 110318611 | A | 10/2019 |
| CN | 110318612 | A | 10/2019 |
| CN | 209585938 | U | 11/2019 |
| CN | 209603673 | U | 11/2019 |
| CN | 215706693 | U | 2/2022 |
| CN | 114109158 | A | 3/2022 |
| CN | 216157389 | U | 4/2022 |
| CN | 216341546 | U | 4/2022 |
| GB | 1396077 | A | 5/1975 |
| JP | 2009-121224 | A | 6/2009 |

OTHER PUBLICATIONS

First Office Action and Search Report dated Jul. 22, 2025, issued in Chinese Patent Application No. 202210615548.1, with English machine translation (25 pages).
Notice of Reasons for Refusal dated Aug. 22, 2025, issued in Japanese Patent Application No. 2024-553894, with English machine translation (8 pages).
International Search Report and Written Opinion for Application No. PCT/CN2023/094846, mailed on Aug. 23, 2023, 10 pages.

* cited by examiner

ACTUATOR, DOOR LOCK ASSEMBLY, AND VEHICLE

CROSS-REFERENCE TO RELATED APPLICATIONS

This application is a continuation application of International Patent Application No. PCT/CN2023/094846, filed on May 17, 2023, which is based on and claims the priority to and benefits of Chinese Patent Application No. 202210615548.1, filed on May 31, 2022. The entire content of all of the above-referenced applications is incorporated herein by reference.

FIELD

The present application relates to the field of vehicles technologies, and in particular to an actuator, a door lock assembly having the actuator, and a vehicle having the door lock assembly.

BACKGROUND

In the related art, a vehicle actuator is usually used to switch and lock the vehicle door lock. The actuator has an idle rotation structure that includes a first gear and a second gear, the first gear is used to connect the first cable, and the second gear is used to connect the second cable. When the motor drives the first gear to rotate, the first cable moves correspondingly while the second cable remains stationary. When the motor drives the second gear to rotate, the second cable moves correspondingly while the first cable remains stationary. The structure of the brake is relatively complex, with many components and a relatively large size, resulting in high cost, so that there is room for improvement.

SUMMARY

The present application solves at least one technical problem in the related art to a certain extent.

The present application provides an actuator that can drive the output rotor to rotate forward or backward through the driver, so that one of the first cable and the second cable is moved and the other is maintained. This may achieve different functions, reduce the number of components, simplify the structure of the actuator, and miniaturize the size of the actuator.

The actuator according to the embodiment of the present application includes: a housing having a cable outlet, a driver, an output rotor, a first cable and a second cable. The driver is disposed inside the housing. The output rotor is configured to be driven to rotate forward or backward by the driver, and has a fitting part. A first end of the first cable and a first end of the second cable fit to the fitting part, and a second end of the first cable and a second end of the second cable extend out of the housing through the cable outlet. The output rotor is configured to rotate forward to drive the first cable through the fitting part, and is configured to rotate backward to drive the second cable through the fitting part.

According to the embodiment of the present application, the output rotor can be driven by the driver to rotate forward, so that the first cable moves while the second cable remains stationary, and the output rotor can be driven by the driver to rotate backward, so that the second cable moves while the first cable remains stationary. This allows the actuator to achieve different functions. The structure of the actuator is simple, with fewer components, which reduces costs and the size of the actuator.

According to some embodiments of the present application, the output rotor includes a groove extending along a rotation direction of the output rotor, the fitting part is defined by the groove, the first end of the first cable is inserted into the groove and in contact with a first end surface of the groove, and the second cable is inserted into the groove and in contact with a second end surface of the groove.

According to some embodiments of the present application, in the rotation direction of the output rotor, cable spaces are disposed on both sides of the fitting part. A side walls of the fitting part includes a through-hole, which extends along the rotation direction of the output rotor. Each cable space is in communication with the fitting part through the through-hole. The first cable and the second cable extend out of the output rotor through the through-hole and the cable spaces.

According to some embodiments of the present application, the housing has a cable routing slot, and the first cable and/or the second cable passes through the cable routing slot and extends toward the cable outlet.

According to some embodiments of the present application, the housing includes a first housing and a second housing, the first housing and the second housing are configured to define an installation space, in which the driver and the output rotor are disposed in the installation space.

According to some embodiments of the present application, the first housing includes the cable routing slot, a first side of the cable routing slot is open towards the second housing, the second housing comprises a stop rib, and the stop rib is located on the first side of the cable routing slot.

According to some embodiments of the present application, actuator further comprises a match gear set, the match gear set includes an input gear and an output gear, the driver drives the input gear to rotate, and the output gear is configured to engage with the output rotor to drive the output rotor to rotate.

According to some embodiments of the present application, the driver includes a motor, the rotation axis of the motor shaft of the motor is at an angle with the center axis of the input gear, and the motor shaft has external threads engaging with the input gear.

According to some embodiments of the present application, each of the first end of the first cable and the first end of the second cable is configured as a cylindrical body, and the diameter of the cylindrical body is equal to or less than the width of the groove.

The present application also provides a door lock assembly.

According to the embodiment of the present application, the door lock assembly includes: an mounting plate; a locking arm assembly, rotatable and disposed on the mounting plate; a lock hook, rotatable and disposed on the mounting plate to lock or unlock with the locking arm assembly; an ice-breaking rocker arm, disposed on the lock hook to drive the lock hook to rotate; a suction assembly, rotatable and disposed on the mounting plate; and the actuator according to any of the above-mentioned embodiments. The second end of the second cable is connected to the ice-breaking rocker arm, and the second end of the first cable is connected to the suction assembly. When the output rotor rotates forward, the first cable drives the suction assembly to rotate to push the lock hook to rotate to lock with the locking arm assembly. When the output rotor rotates backward, the second cable rotates to drive the ice-breaking rocker arm to rotate to drive the lock hook away from the locking arm assembly.

According to the embodiment of the present application, the driver can drive the output rotor to rotate forward, so that the first cable drives the lock hook to lock with the locking arm assembly, thereby realizing the locking of the car door, and the driver can also drive the output rotor to rotate backward, so that the second cable can drive the ice-breaking rocker arm to drive the lock hook away from the locking arm assembly, thereby realizing the ice-breaking unlocking of the car door. The operation process of the door lock assembly is stable and reliable, and the structure of the door lock assembly is simple with fewer parts, which is conducive to reducing the cost.

According to some embodiments of the present application, the lock hook includes a first fitting part and a second fitting part, the locking arm assembly includes a first locking part and a second locking part, and the door lock assembly includes a half-locked state and a fully-locked state. In the half-locked state, the first fitting part engages with the first locking part. In the fully-locked state, the second fitting part engages with the second locking part.

According to some embodiments of the present application, the suction assembly rotates to push the lock hook to rotate to switch the door lock assembly from the half-locked state to the fully-locked state.

The present application also provides a vehicle.

According to some embodiments of the present application, the vehicle includes the door lock assembly as described in any of the above embodiments.

According to some embodiments of the present application, the driver can drive the output rotor to rotate forward, so that the first cable drives the lock hook to lock with the locking arm assembly, thereby realizing the locking of the car door, and the driver can also drive the output rotor to rotate backward, so that the second cable can drive the ice-breaking rocker arm to drive the lock hook away from the locking arm assembly, thereby realizing the ice-breaking unlocking of the car door. The operation process of the door lock assembly is stable and reliable, and the structure of the door lock assembly is simple with fewer parts, which is conducive to reducing the cost, thereby improving the overall performance of the vehicle.

Figure 1:
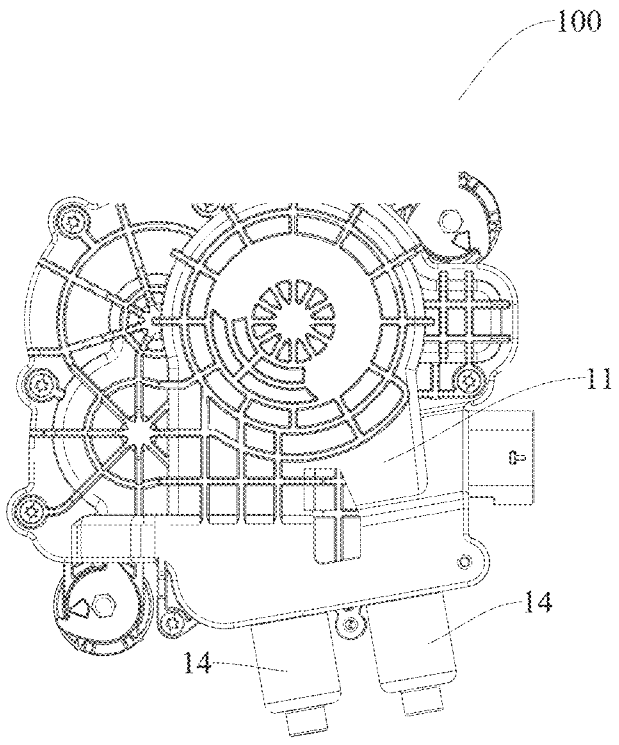
FIG. 1 is a schematic diagram of the actuator according to an embodiment of the present application.

REFERENCE SIGNS actuator 100, housing 1, first housing 11, cable routing slot 111, cable outlet 112, first central shaft 113, second central shaft 114, third central shaft 115, limiting plate 116, second housing 12, stop rib 121, guide seat 13, sealing sleeve 14, motor 2, motor shaft 21, output rotor 3, groove 31, first end surface 311, second end surface 312, cable space 32, through-hole 33, notch 34, outer gear part 35, first rotation hole 36, first cable 41, second cable 42, limit column 43, match gear set 5, input gear 51, first gear segment 511, second gear segment 512, output gear 52, third gear segment 521, fourth gear segment 522, door lock assembly 200, mounting plate 201, locking arm assembly 202, first locking part **202*a*, second locking part 202*b*, lock hook 203, first fitting part 203*a*, second fitting part 203*b*, ice-breaking rocker arm 204, suction assembly 205, first suction structure 205*a*, second suction structure 205*b*, and vehicle 300**.

DETAILED DESCRIPTION

The following will describe the embodiments of the present application in detail. The examples of the embodiments are shown in the accompanying drawings, in which the same or similar reference numerals indicate the same or similar elements or elements with the same or similar functions throughout. The embodiments described below with reference to the accompanying drawings are examples and are intended for explaining the present application, and should not be understood as a limitation on the present application.

The actuator 100 according to the embodiment of the present application is described below with reference to FIGS. 1-14.

Referring to FIGS. 1-14, the actuator 100 according to the embodiment of the present application includes: a housing 1, a driver, an output rotor 3, a first cable 41, and a second cable 42. Among them, the housing 1 having a cable outlet 112; the driver being disposed inside the housing 1; the output rotor 3 being configured to be driven to rotate forward or backward by the driver, the output rotor 3 having a fitting part; a first end of the first cable 41 and a first end of the second cable 42 fitting to the fitting part, a second end of the first cable 41 and a second end of the second cable 42 extending out of the outer housing 1 through the cable outlet 112, the output rotor 3 is configured to rotate forward to drive the first cable 41 through the fitting part, and the output rotor 3 is configured to rotate backward to drive the second cable 42 through the fitting part.

Therefore, the output rotor 3 can be driven by the driver to rotate forward or backward, so that one of the first cable 41 and the second cable 42 is moved and the other one remain stable, thereby achieving different functions, which is helpful to reduce the number of components, reduce the cost, simplify the structure of the actuator 100, and minimize the size of the actuator 100.

Figure 2:
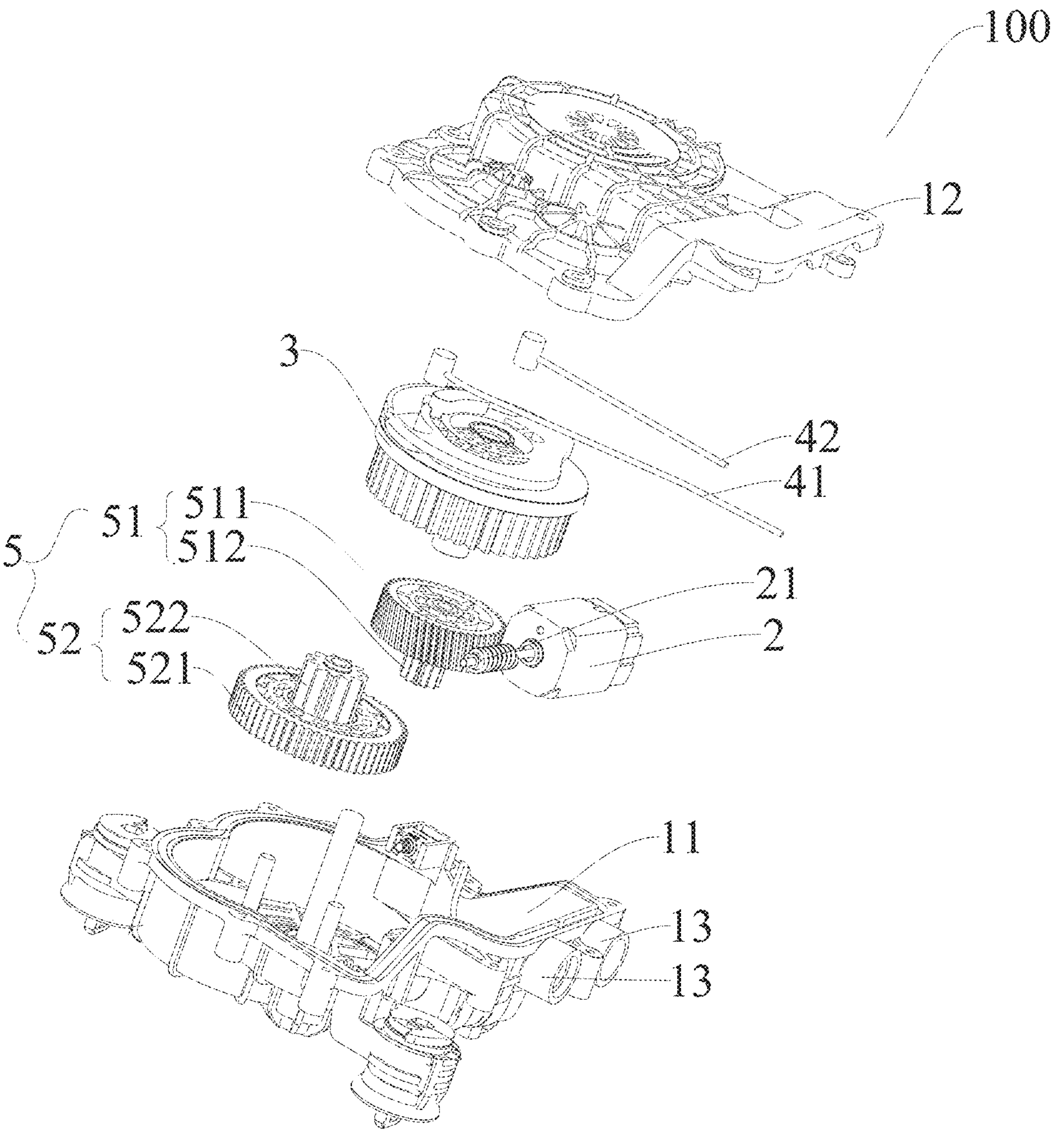
FIG. 2 is an exploded view of the actuator according to an embodiment of the present application.
Figure 3:
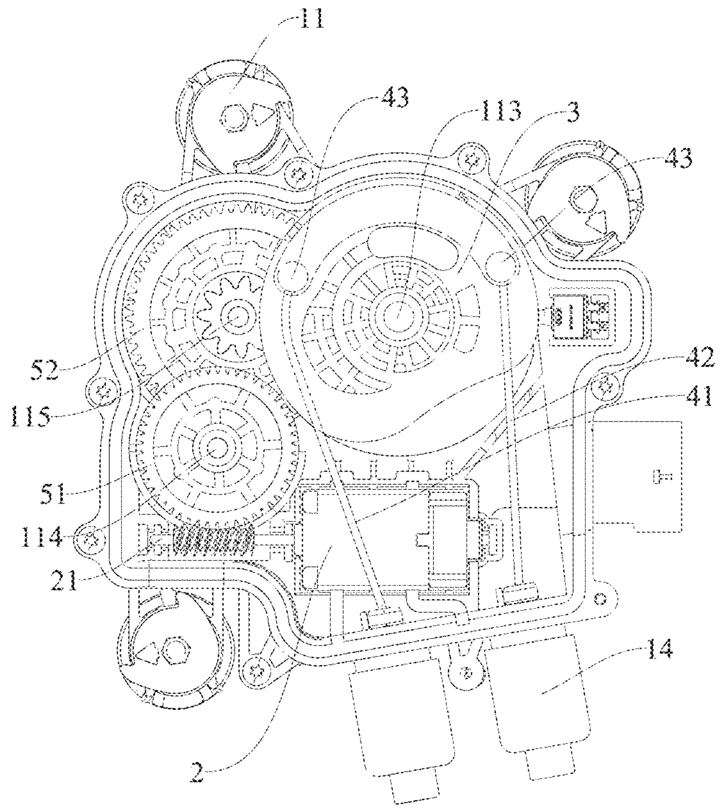
FIG. 3 is a schematic diagram of the internal structure of the actuator according to an embodiment of the present application.

For example, referring to FIGS. 1-3, an installation space can be formed inside the housing 1, and the driver, the output rotor 3, the first cable 41 and the second cable 42 are all installed in the installation space of the housing 1, so that the housing 1 can provide shielding protection for the remaining parts of the actuator 100, to improve the stability of the actuator 100. A first central shaft 113 can be provided in the installation space, and a first rotation hole 36 can be formed on the output rotor 3, and the first central shaft 113 can be inserted into the first rotation hole 36, so that the output rotor 3 is rotatably installed in the installation space of the housing 1, and the output end of the driver is connected to the output rotor 3 in a power transmission manner, so that the driver can drive the output rotor 3 to rotate forward or backward.

It needs to be noted that the forward rotation can be set as clockwise rotation, and the backward rotation can be set as counterclockwise rotation. Or the backward rotation can be set as clockwise rotation, and the forward rotation can be set as counterclockwise rotation. The present application does not limit this. Of course, in the embodiment shown in FIG. 3, the forward rotation is clockwise rotation, and the backward rotation is counterclockwise rotation.

Figure 4:
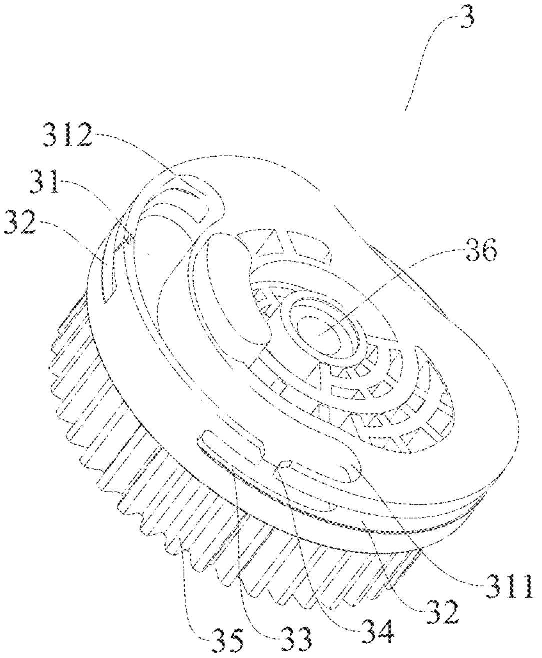
FIG. 4 is a schematic diagram of the output rotary member according to an embodiment of the present application.

For example, referring to FIGS. 2-4, the output rotor 3 can have a fitting part, the first end of the first cable 41 can be movably installed on the fitting part, and the first end of the second cable 42 can be movably installed on the fitting part. Two guide seats 13 that are spaced apart in the left-right direction in FIG. 1 and protrude outward are provided on the outer peripheral wall of the housing 1. The housing 1 can form cable outlet 112 respectively at the two guide seats 13, the cable outlet 112 are used to connect the installation space with the outside of the housing 1. The second end of the first cable 41 can pass through the cable outlet 112 on the left side in FIG. 1 and extend to the outside of the housing 1, and be connected to the corresponding functional component. The second end of the second cable 42 can pass through the cable outlet 112 on the right side in FIG. 1 and extend to the outside of the housing 1, and be connected to the corresponding functional component.

When the driver drives the output rotor 3 to rotate forward, the fitting part can drive the first end of the first cable 41 to move, to pull the second end of the first cable 41 to move, so as to drive the corresponding functional component to work, and the fitting part can move relative to the second cable 42 to keep the second cable 42 stationary. When the driver drives the output rotor 3 to rotate backward, the fitting part can drive the first end of the second cable 42 to move, to pull the second end of the second cable 42 to move, so as to drive the corresponding functional component to work, and the fitting part can move relative to the first cable 41 to keep the first cable 41 stationary. Thereby, the first cable 41 and the second cable 42 can be selectively driven to achieve different functions.

In an embodiment, a sealing sleeve 14 can be fitted outside the guide seat 13, and has a cable outlet hole corresponding to the cable outlet 112. The first cable 41 and the second cable 42 can be sequentially passed through the cable outlet 112 and the cable outlet hole to extend to the outside of the housing 1. The sealing sleeve 14 is used to seal the cable outlet 112, in order to prevent foreign matter from entering the installation space.

According to the embodiments of the present application, the driver can drive the output rotor 3 to rotate forward, so as to drive the first cable 41 to move while keeping the second cable 42 stationary, and can drive the output rotor 3 to rotate backward, so as to drive the second cable 42 to move while keeping the first cable 41 stationary, thereby achieving different functions, simplifying the structure of the actuator 100 with fewer components, reducing the cost, and minimizing the size of the actuator 100.

In some embodiments of the present application, the output rotor 3 is provided with a groove 31 extending along its rotation direction, the fitting part is defined by the groove 31, the first end of the first cable 41 is inserted into the groove 31 and in contact with the first end surface 311 of the groove 31, the first end of the second cable 42 is inserted into the groove 31 and in contact with the second end surface 312 of the groove 31.

For example, referring to FIG. 4, the output rotor 3 can be constructed as a disk, a first rotation hole 36 penetrating vertically is provided at the center position of the output rotor 3, and an arc-shaped groove 31 is provided on the upper side of the output rotor 3 surrounding the first rotation hole 36. The central axis of the groove 31 is aligned with the central axis of the first rotation hole 36, the end face of the groove 31 in the counterclockwise direction can be set as the first end surface 311, and the end face of the groove 31 in the clockwise direction can be set as the second end surface 312. Referring to FIG. 2, the first end of the first cable 41 and the first end of the second cable 42 have a limit column 43, and the limit column 43 is a cylindrical body. The diameter of the limit column 43 is equal to or less than the width of the groove 31, and the limit column 43 is movably inserted into the groove 31.

The limit column 43 of the first cable 41 can be inserted into the groove 31, so that the outer peripheral wall of the limit column 43 of the first cable 41 is in contact with the first end surface 311 of the groove 31. The limit column 43 of the second cable 42 can be inserted into the groove 31, so that the limit column 43 of the second cable 42 is in contact with the second end surface 312 of the groove 31. In this way, when the driver drives the output rotor 3 to rotate forward, the first end surface 311 can exert a force on the limit column 43 of the first cable 41 to pull the second end of the first cable 41 to move, and the limit column 43 of the second cable 42 can move relative to the output rotor 3 along the groove 31, so that the second end of the second cable 42 remains stationary. When the driver drives the output rotor 3 to rotate backward, the second end surface 312 can exert a force on the limit column 43 of the second cable 42 to pull the second end of the second cable 42 to move, and the limit column 43 of the first cable 41 can move relative to the output rotor 3 along the groove 31, so that the second end of the first cable 41 remains stationary. Therefore, the first cable 41 and the second cable 42 can be selectively driven.

Through the above configuration, the structure of the output rotor 3 is simplified, which is conducive to reducing the processing cost of the output rotor 3, and the movement of the output rotor 3 is stable and reliable, which is conducive to improving the reliability of the actuator 100.

In some embodiments of the present application, the matching part may include two matching grooves, each matching groove is formed to extend along the rotation direction of the output rotor 3, the first end of the first cable 41 and the first end of the second cable 42 are respectively inserted into the two matching grooves in a one-to-one correspondence, in order to realize the selective driving of the first cable 41 and the second cable 42.

In some embodiments of the present application, in the rotation direction of the output rotor 3, cable spaces 32 are arranged on both sides of the fitting part. A side wall of the fitting part is provided with a through-hole 33, and the through-hole 33 extends along the rotation direction of the output rotor 3. Each of the cable spaces 32 is connected with the fitting part through the through-hole 33, and the first cable 41 and the second cable 42 extend out of the output rotor 3 through the through-hole 33 and the cable spaces 32.

For example, referring to FIGS. 3-4, the cable spaces 32 can be respectively provided on both sides of the groove 31 in the circumferential direction of the output rotor 3, and the cable spaces 32 are provided on the outer peripheral wall of the output rotor 3 and are adapted to open outward. A through-hole 33 for wiring is provided on the side wall of the groove 31 far away from the first rotation hole 36, the through-hole 33 is used to connect the groove 31 with the radial outer side of the output rotor 3, the through-hole 33 extends along the circumferential direction of the output rotor 3, the width dimension of the through-hole 33 is not greater than the width dimension of the cable space 32, one end of the through-hole 33 is used to communicate with the corresponding cable space 32, so that the groove 31 can be connected with the two cable spaces 32 through the corresponding through-holes 33 respectively. In this way, referring to FIG. 3, after the limit columns 43 of the first cable 41 and the second cable 42 are inserted into the groove 31, the first cable 41 and the second cable 42 can extend to the cable space 32 through the through-hole 33 and be arranged along the cable space 32, and extend out of the cable space 32 and directly towards the cable outlet 112. Thus, by providing the cable spaces 32, the first cable 41 and the second cable 42 can avoid other components, so as to avoid interference of other components with the movement of the first cable 41 and the second cable 42, and the overall bending of the first cable 41 and the second cable 42 is relatively small, which is conducive to improving the stability of the movement of the first cable 41 and the second cable 42.

For example, referring to FIG. 4, a notch 34 can be provided on the upper side of the output rotor 3 at the position corresponding to the through-hole 33 for wiring. The notch 34 is used to connect the through-hole 33 with the outside, the first cable 41 and the second cable 42 can be inserted into or removed from the through-hole 33 through the notch 34, so that the assembly and disassembly process of the first cable 41 and the second cable 42 is simple, which is conducive to reducing the difficulty of maintenance.

In some embodiments of the present application, the housing 1 is provided with a cable routing slot 111 inside, the first cable 41 and/or the second cable 42 passes through the cable routing slot 111 and then extend towards the cable outlet 112. In this way, by providing the cable routing slot 111, the routing direction of the first cable 41 and/or the second cable 42 can be guided, and the risk of the first cable 41 and/or the second cable 42 being entangled can be reduced.

Figure 6:
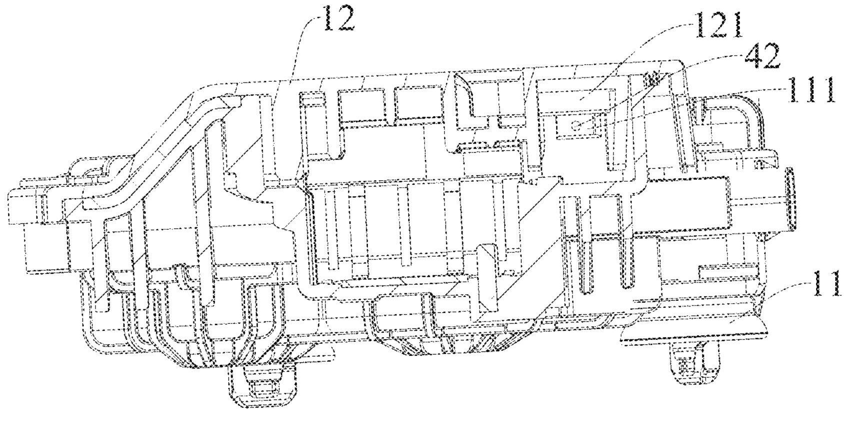
FIG. 6 is a cross-sectional view of the housing according to an embodiment of the present application.

For example, referring to FIGS. 3 and 6, a baffle can be provided in the installation space of the housing 1. The baffle is used to separate the cable outlet 112 from the output rotor 3, and a cable routing slot 111 is provided on the baffle, the cable routing slot 111 is used to connect the output rotor 3 with the cable outlet 112. In this way, after the first cable 41 and the second cable 42 extend out of the output rotor 3, they can pass through the cable routing slot 111 and extend to the outside of the housing 1 from the cable outlet 112.

Through the above configuration, the external foreign matter can be prevented from entering through the cable outlet 112 and directly flowing to the output rotor 3, which reduces the accumulation of dust on the output rotor 3, reduces the maintenance frequency, and improves the practicality of the output rotor 3.

In some embodiments of the present application, the housing 1 includes a first housing 11 and a second housing 12, the first housing 11 and the second housing 12 are configured to define an installation space, and the driver and the output rotor 3 are installed in the installation space.

For example, referring to FIGS. 2-3, the first housing 11 can be constructed as an box-like structure open upward, and the second housing 12 is designed in a corresponding shape relative to the open of the first housing 11. The second housing 12 can be detachably installed on the upper side of the first housing 11 to seal the open of the first housing 11, the installation space is defined between the first housing 11 and the second housing 12, the driver and the output rotor 3 are installed on the first housing 11 and are located within the installation space. In this way, the housing 1 can protect the driver and the output rotor 3, thereby improving the stability of the actuator 100. When the driver and the output rotor 3 fail, the second housing 12 can be detached from the first housing 11 to expose the driver and the output rotor 3 outward, which is conducive to maintenance and helps reduce the difficulty of maintenance.

In some embodiments of the present application, the first housing 11 is provided with the cable routing slot 111, one side (e.g., a first side) of the cable routing slot 111 is open towards the second housing 12, the second housing 12 is provided with a stop rib 121, and the stop rib 121 is located on the open side (e.g., the first side) of the cable routing slot 111.

Figure 5:
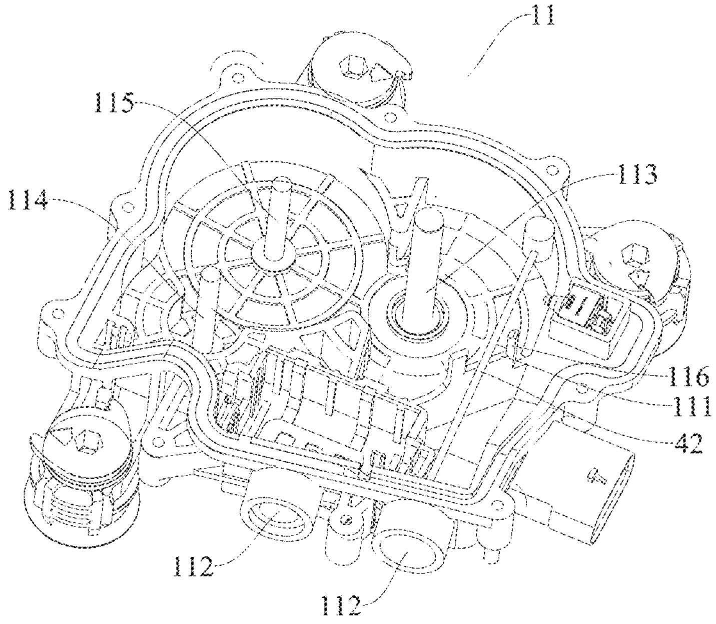
FIG. 5 is a schematic diagram of the first housing according to an embodiment of the present application.

For example, referring to FIGS. 5-6, a baffle can be provided on the upper side of the first housing 11. The baffle is arranged to extend upward, and two upward-extending limiting plates 116 are spaced apart on the upper side of the baffle. The cable routing slot 111 that is open upward is defined between the two limiting plates 116, a downward protruding stop rib 121 is provided on the lower side of the second housing 12 corresponding to the cable routing slot 111, the two sides of the stop rib 121 are used to support the upper ends of the two limiting plates 116, and the stop rib 121 is used to close the open side of the cable routing slot 111. In this way, the first cable 41 and the second cable 42 can be prevented from disengaging from the cable routing slot 111 during the movement, which improves the reliability of the first cable 41 and the second cable 42, and improves the stability of the actuator 100.

In some embodiments of the present application, referring to FIG. 2, the actuator 100 includes a match gear set 5. The match gear set 5 includes an input gear 51 and an output gear 52, the driver drives the input gear 51 to rotate, and the output gear 52 is configured to engage with the output rotor 3 to drive the output rotor 3 to rotate.

For example, a match gear set 5 can be installed in the installation space. The match gear set 5 includes an input gear 51 and an output gear 52, the input gear 51 is used to mesh with the output end of the driver, the driver can drive the input gear 51 to rotate. The output gear 52 is meshed with the output rotor 3, so that the output gear 52 can drive the output rotor 3 to rotate, so as to realize the forward or backward rotation of the output rotor 3, thereby driving the first cable 41 or the second cable 42 to move.

For example, referring to FIGS. 2-3 and FIG. 5, a second central shaft 114 and a third central shaft 115 can be spaced apart on the first housing 11. The second central shaft 114 and the third central shaft 115 extend vertically, and the input gear 51 is rotatably fitted on the second central shaft 114. The input gear 51 has a first gear segment 511 and a second gear segment 512, the first gear segment 511 is used to mesh with the output end of the driver, and the second gear segment 512 is located below the first gear segment 511. The output gear 52 is rotatably fitted on the third central shaft 115. The output gear 52 has a third gear segment 521 and a fourth gear segment 522. The third gear segment 521 is located below the fourth gear segment 522, the third gear segment 521 is used to mesh with the second gear segment 512 of the input gear 51, and the first gear segment 511 and the fourth gear segment 522 are spaced apart in the horizontal direction, so that the input gear 51 can drive the output gear 52 to rotate around the third central shaft 115. Referring to FIG. 4, the lower part of the outer side of the output rotor 3 has an outer gear part 35. The outer gear part 35 is used to mesh with the fourth gear segment 522, so that the output gear 52 can drive the output rotor 3 to rotate.

Through the above configuration, the driver can drive the output rotor 3 to rotate at the required speed, and the rotation process is smooth and reliable. The match gear set 5 has a small vertical space occupation, which improves the rationality of the layout of the installation space and reduces the vertical size of the actuator 100.

In some embodiments of the present application, the driver is a motor 2, the rotation axis of the motor shaft 21 of the motor 2 is at an angle with respect to the center axis of the input gear 51, and the motor shaft 21 has external threads engaging with the input gear 51.

For example, referring to FIGS. 2-3, the driver can be set as a motor 2. The motor 2 is arranged to extend horizontally as a whole. The motor 2 has a motor shaft 21, the center axis line of the input gear 51 is arranged to extend vertically, so that the rotation axis of the motor shaft 21 has a 90-degree angle with respect to the center axis line of the input gear 51. The motor shaft 21 has an external thread on the outside. The external threads are used to mesh with the first gear segment 511 of the input gear 51, so that the motor shaft 21 can drive the input gear 51 to rotate, and then through the output gear 52 to drive the output rotor 3 to rotate.

It can be understood that, setting the rotation axis of the motor shaft 21 is at an angle with respect to the center axis line of the input gear 51, reduces the occupation of the installation space, improves the compactness and rationality of the layout, and reduces the overall volume of the actuator 100.

In some embodiments of the present application, the driver can be a motor, and the motor shaft is directly coupled with the output rotor 3 to drive the output rotor 3 to rotate forward or backward, so that the coupling manner is simple.

The present application also provides a door lock assembly 200.

Figure 7:
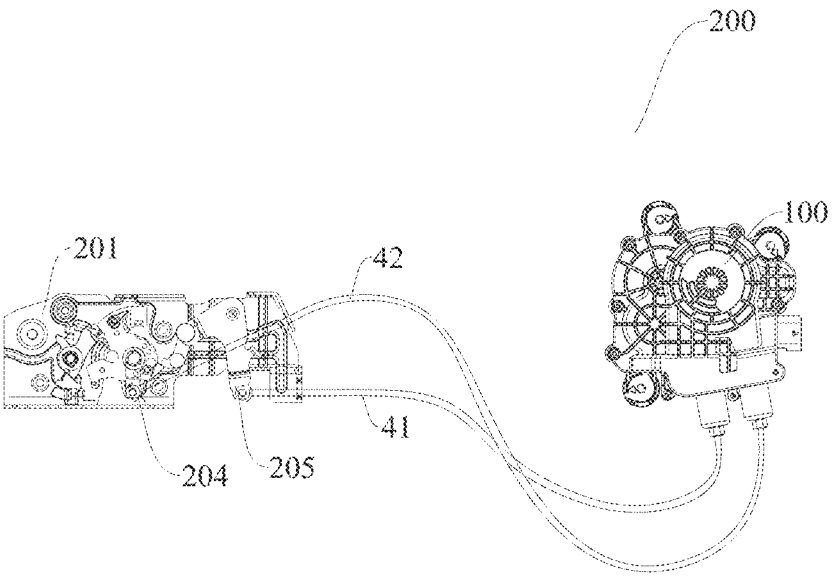
FIG. 7 is a schematic diagram of the door lock assembly according to an embodiment of the present application.
Figure 8:
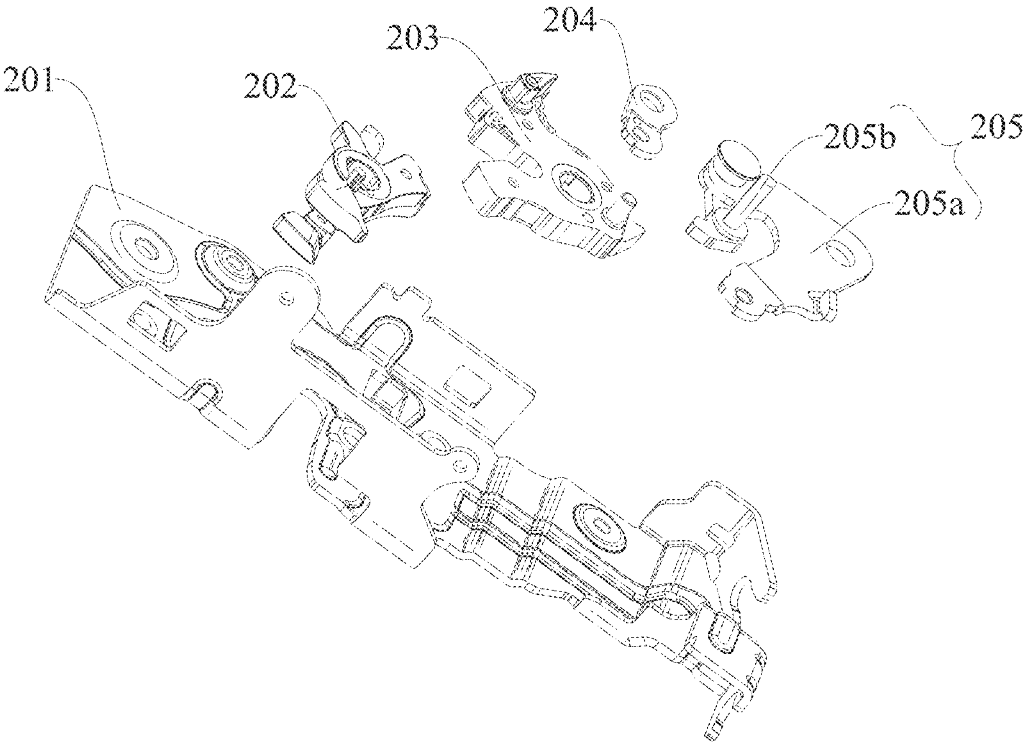
FIG. 8 is an exploded view of the door lock assembly according to an embodiment of the present application.

As shown in FIGS. 7-8, the door lock assembly 200 according to the embodiment of the present application includes: a mounting plate 201; a locking arm assembly 202, being rotatable and provided on the mounting plate 201; a lock hook 203, being rotatable and provided on the mounting plate 201 to lock or unlock with the locking arm assembly 202; an ice-breaking rocker arm 204, being provided on the lock hook 203 to drive the lock hook 203 to rotate; a suction assembly 205, being rotatable and provided on the mounting plate 201; and the actuator 100 according to any one of the above embodiments, the second end of the second cable 42 being connected to the ice-breaking rocker arm 204, and the second end of the first cable 41 being connected with the suction assembly 205. When the output rotor 3 rotates forward, the first cable 41 drives the suction assembly 205 to rotate to push the lock hook 203 to rotate and to lock with the locking arm assembly 202. When the output rotor 3 rotates backward, the second cable 42 rotates to drive the ice-breaking rocker arm 204 to rotate to drive the lock hook 203 to rotate away from the locking arm assembly 202.

Thus, the locking of the vehicle door can be realized by driving the output rotor 3 to rotate forward using the driver, so that the first cable 41 drives the lock hook 203 to lock with the locking arm assembly 202, and the unlocking of the vehicle door can be realized by driving the output rotor 3 to rotate backward using the driver, so that the second cable 42 can drive the ice-breaking rocker arm 204 to drive the lock hook 203 to disengage from the locking arm assembly 202. The structure of the door lock assembly 200 is simple with fewer parts, which reduces the cost, and the working process is stable and reliable.

For example, referring to FIGS. 7-8, multiple spaced-apart connection rotation holes can be provided on the mounting plate 201, and the locking arm assembly 202 has matching holes. The rotation pin is suitable for passing through the matching holes of the locking arm assembly 202 and the connection rotation holes of the mounting plate 201, to rotatably install the locking arm assembly 202 on the left side area of the mounting plate 201. The lock hook 203 has corresponding matching holes, and the rotation pin is suitable for passing through the matching holes of the lock hook 203 and the connection rotation holes of the mounting plate 201, to rotatably install the lock hook 203 in the central area of the mounting plate 201. The lock hook 203 has an unlocked position and a locked position, and the lock hook 203 can rotate clockwise to switch from the unlocked position to the locked position. When the lock hook 203 is in the unlocked position, the vehicle door is unlocked, and when the lock hook 203 is in the locked position, the vehicle door is locked. The left side of the lock hook 203 is used to engage with the locking arm assembly 202, and the locking arm assembly 202 is used to block the counterclockwise rotation of the lock hook 203, so that the lock hook 203 is in the locked position.

The actuator 100 is disposed on the right side of the mounting plate 201 (the right side here indicates the approximate position of the actuator 100, and is not limited to this configuration). The first cable 41 and the second cable 42 of the actuator 100 are constructed as a flexible structure, and the first cable 41 and the second cable 42 extend leftward to the mounting plate 201. An ice-breaking rocker arm 204 is provided on the lock hook 203, and is connected to the lower side area of the lock hook 203. The second end of the second cable 42 is connected to the end of the ice-breaking rocker arm 204 that is away from the lock hook 203, and the second cable 42 can drive the lock hook 203 to rotate counterclockwise through the ice-breaking rocker arm 204, to drive the lock hook 203 to move to the unlocked position.

At the same time, the suction assembly 205 comprises a first suction structure **205*a* and a second suction structure 205*b*. The first suction structure 205*a* has matching holes, and the rotation pin is suitable for passing through the matching holes of the first suction structure 205***a* and the connection rotation holes of the mounting plate 201, to rotatably install the first suction structure 205*a* on the upper right side of the mounting plate 201. The left side of the first suction structure 205*a* is rotatably connected to the second suction structure 205*b*, the second suction structure 205*b* is used to press downward on the right side of the lock hook 203, and the lower side of the first suction structure 205*a* is connected to the second end of the first cable 41. The first cable 41 can drive the first suction structure 205*a* to rotate counterclockwise, so that the second suction structure 205*b* can drive the lock hook 203 to rotate clockwise, so that the lock hook 203 can rotate to the locked position.

Figure 9:
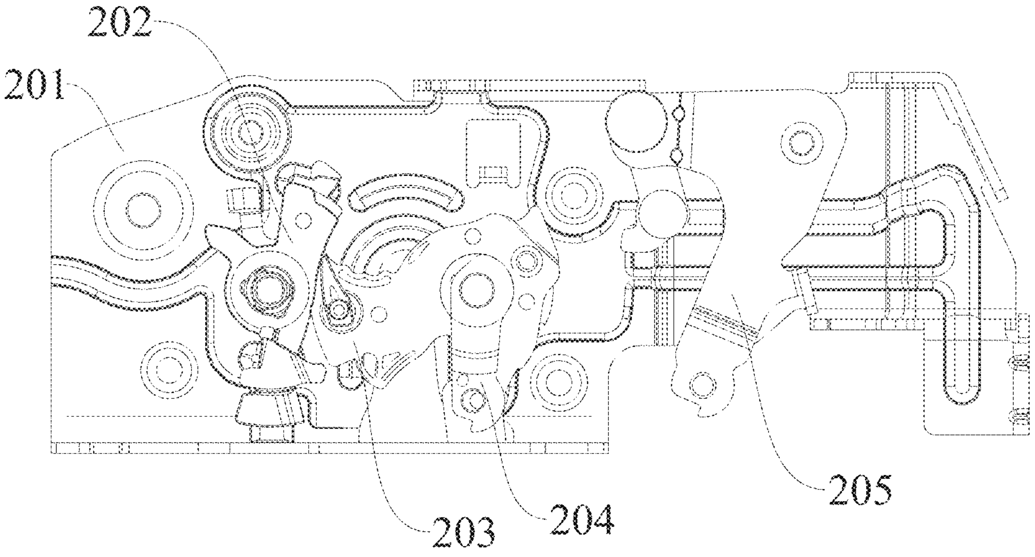
FIG. 9 is a schematic diagram of the door lock assembly in the unlocked state according to an embodiment of the present application.
Figure 10:
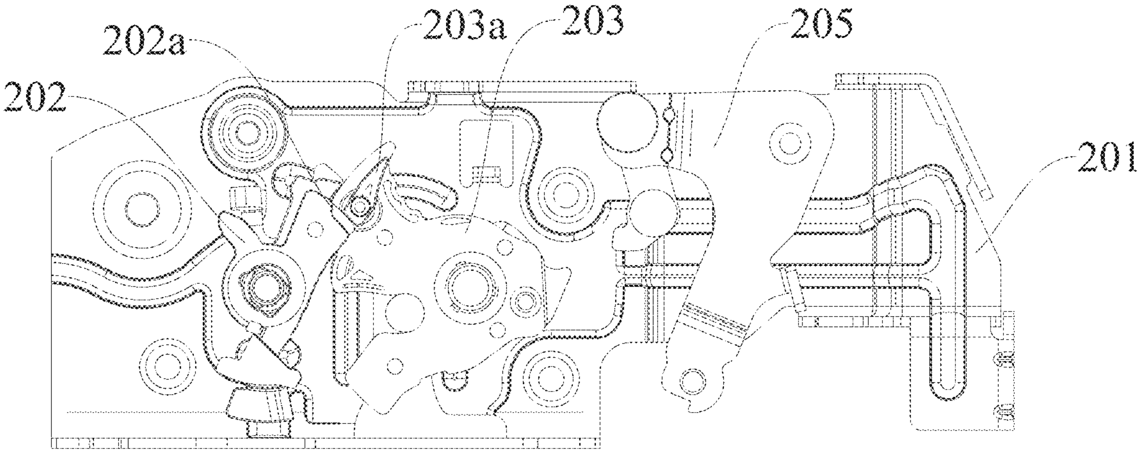
FIG. 10 is a schematic diagram of the door lock assembly in the half-locked state according to an embodiment of the present application.
Figure 11:
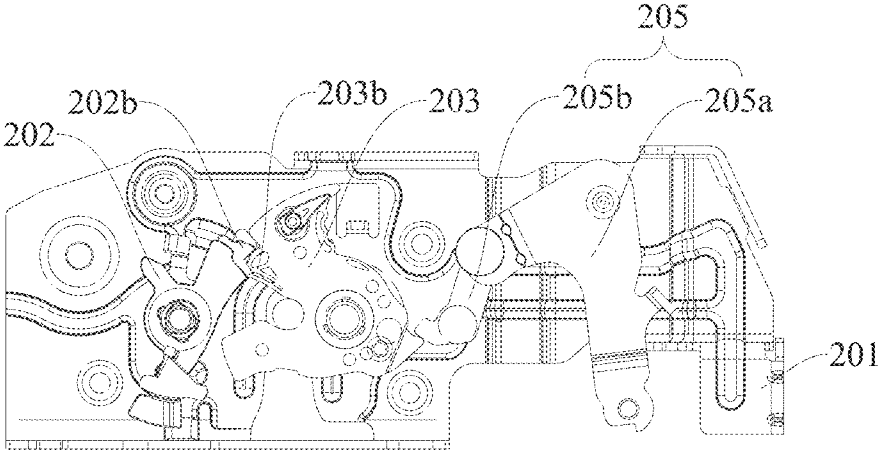
FIG. 11 is a schematic diagram of the door lock assembly in the fully-locked state according to an embodiment of the present application.
Figure 12:
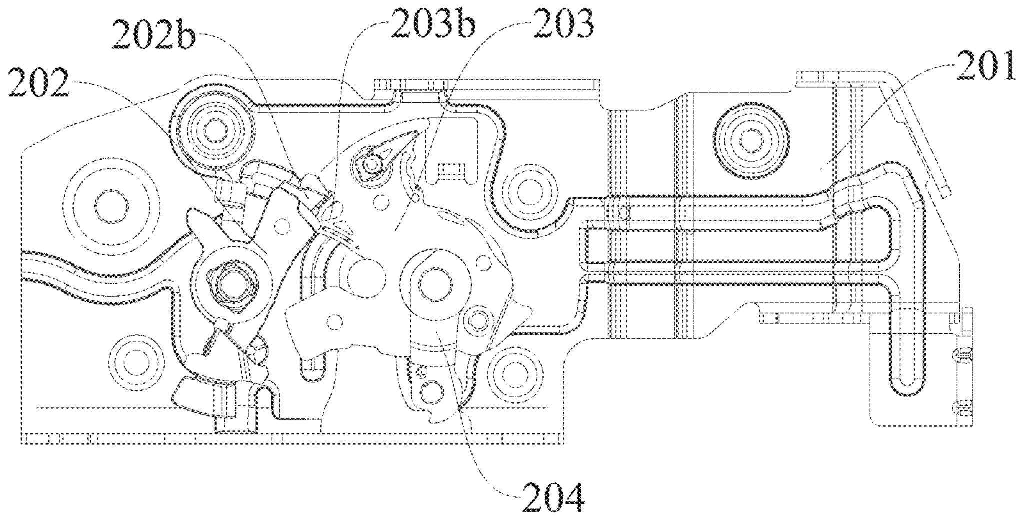
FIG. 12 is a schematic diagram of a partial structure of the door lock assembly according to an embodiment of the present application.
Figure 13:
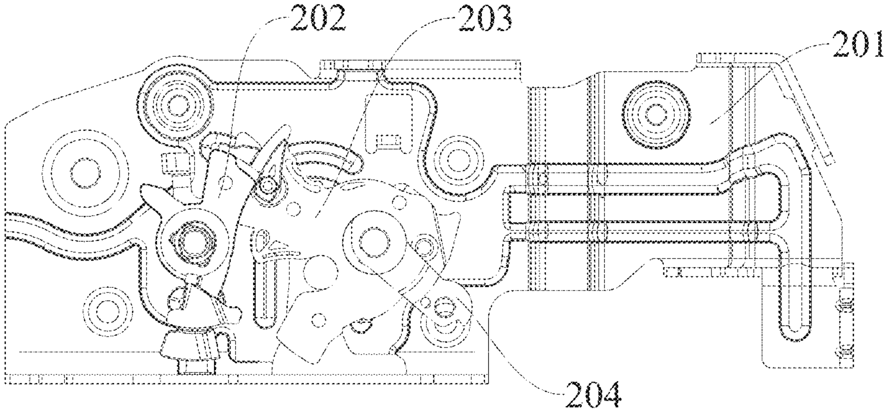
FIG. 13 is a schematic diagram of a partial structure of the door lock assembly, in which the de-icing rocker arm is in the unlocked state, according to an embodiment of the present application.

In the working process, referring to FIGS. 12-13, when the vehicle door is locked and the external temperature is too low, the lock hook 203 may be iced. When the user controls the vehicle door to be unlocked, the backward force of the unlocking process is insufficient, and the lock hook 203 will remain in the locked position, causing the vehicle door to be unable to open. At this time, the driver can drive the output rotor 3 to backward, the engaging part can pull the second cable 42, the second end of the second cable 42 can pull the ice-breaking rocker arm 204 to rotate counterclockwise around the rotation pin, the ice-breaking rocker arm 204 can drive the lock hook 203 to rotate counterclockwise to move away from the locking arm assembly 202 and switch to the unlocked position, to achieve the ice-breaking unlocking of the vehicle door. Referring to FIGS. 9-11, when the lock hook 203 is not in the closed position, the driver can drive the output rotor 3 to rotate in the forward direction, the engaging part can pull the first cable 41, the second end of the first cable 41 can pull the suction assembly 205 to rotate counterclockwise around the rotation pin, the second suction structure 205*b* can apply a downward force on the right side of the lock hook 203, so that the lock hook 203 can rotate clockwise to the locked position, to achieve the locking of the vehicle door.

Through the above-mentioned configuration, the output rotor 3 can be driven to rotate forward by the driver, so that the first cable 41 drives the lock hook 203 and the locking arm assembly 202 to lock, thereby realizing the locking of the car door. Additionally, the output rotor 3 can be driven to rotate backward by the driver, so that the second cable 42 can drive the ice-breaking rocker arm 204 to drive the lock hook 203 away from the locking arm assembly 202, thereby realizing the de-icing unlocking of the car door. The working process of the door lock assembly 200 is stable and reliable, and the structure of the door lock assembly 200 is simple with fewer parts, which is beneficial for reducing costs.

In some embodiments of the present application, the lock hook 203 includes a first fitting part 203*a* and a second fitting part 203*b*, the locking arm assembly 202 includes a first locking part 202*a* and a second locking part 202*b*, and the door lock assembly 200 includes a half-locked state and a fully-locked state. In the half-locked state, the first fitting part 203*a* engages with the first locking part 202*a* and the second fitting part 203*b* does not engage with the second locking part 202*b*, and in the fully-locked state, the second fitting part 203*b* engages with the second locking part 202*b* and the first fitting part 203*a* does not engage with the first locking part 202*a*.

For example, referring to FIGS. 8-11, the lock hook 203 can have the first fitting part 203*a* and the second fitting part 203*b* arranged sequentially in a counterclockwise direction on the outer side of the lock hook 203, and the first fitting part 203*a* is located on the side of the second fitting part 203*b* away from the mounting plate 201. The locking arm assembly 202 has a first locking part 202*a* and a second locking part 202*b*, where the first locking part 202*a* is located on the side of the second locking part 202*b* away from the mounting plate 201 and faces the first fitting part 203*a*.

The door lock assembly 200 has an unlocked state, a half-locked state, and a fully-locked state, that is, the door lock can be set to an unlocked position, a half-locked position, and a locked position. As shown in FIG. 9, when the door lock assembly 200 is in the unlocked state, the lock hook 203 is in the unlocked position, and the first fitting part 203*a* and the second fitting part 203*b* are spaced apart from the locking arm assembly 202, so the car door can move freely relative to the body. As shown in FIG. 10, when the door lock assembly 200 is in the half-locked state, the lock hook 203 is in the half-locked position, and the first fitting part 203*a* engages with the first locking part 202*a*, and the second fitting part 203*b* does not engage with the second locking part 202*b*, so the locking arm assembly 202 can prevent the lock hook 203 from rotation clockwise to the unlocked position to realize self-unlocking, and the user can drive the lock hook 203 to move to the unlocked position through the inner or outer handle of the car door to unlock the door. As shown in FIG. 11, when the door lock assembly 200 is in the fully-locked state, the lock hook 203 is in the locked position, and the second fitting part 203*b* of the lock hook 203 engages with the first locking part 202*a* of the locking arm assembly 202, and the first fitting part 203*a* does not engage with the first locking part 202*a*, so the locking arm assembly 202 can prevent the lock hook 203 from rotation clockwise to the unlocked position to realize self-unlocking, and the user cannot drive the lock hook 203 to rotate through the inner or outer handle of the car door, so the car door is fully locked.

It is understandable that by configuring the door lock assembly 200 to have multiple different states, the car door can have various states to meet the actual needs of the user, which is beneficial for improving user satisfaction.

In some embodiments of this application, the suction assembly 205 rotates to drive the lock hook 203 to rotate, so that the door lock assembly 200 switches from the half-locked state to the fully-locked state. For example, referring to FIGS. 10-11, when the door lock assembly 200 is in the half-locked state, the lock hook 203 is in the half-locked position. At this time, the output rotor 3 can be driven to rotate forward, the fitting part pulls the first cable 41, and the second end of the first cable 41 can pull the first suction structure 205*a* to rotate counterclockwise around the pivot pin. The second suction structure 205*b* can apply a downward force on the right side of the lock hook 203, causing the lock hook 203 to rotate clockwise to the locked position. The second fitting part 203*b* of the lock hook 203 engages with the second locking part 202*b* of the locking arm assembly 202, so as to switch the door lock assembly 200 to the fully-locked state. In this way, the locking process of the car door is simplified, which is beneficial for improving the reliability of the car door locking and enhancing the safety of the passengers.

The present application also discloses a vehicle 300.

Figure 14:
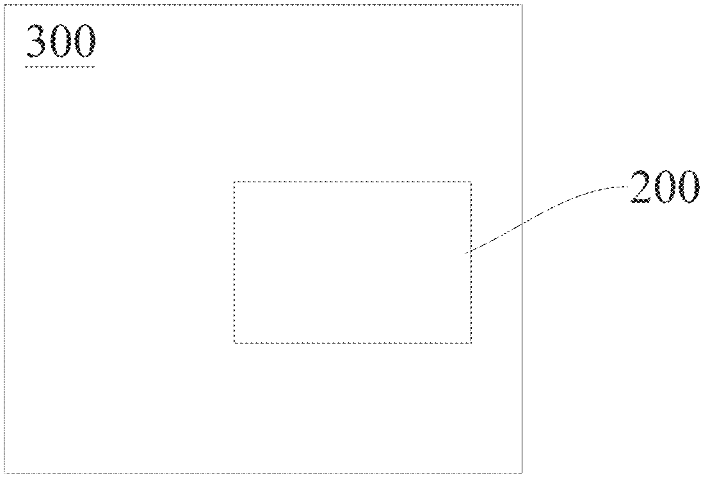
FIG. 14 is a schematic diagram of the installation of the door lock assembly according to an embodiment of the present application.

Referring to FIG. 14, the vehicle 300 according to the embodiment of the present application includes the door lock assembly 200 of any of the above-mentioned embodiments. Among the door lock assemblies, the driver can drive the output rotor 3 to rotate forward, so that the first cable 41 drives the lock hook 203 to engage with the locking arm assembly 202, thereby realizing the locking of the car door.

Additionally, the driver can drive the output rotor 3 to rotate backward, so that the second cable 42 can drive the ice-breaking rocker arm 204 to drive the lock hook 203 away from the locking arm assembly 202, thereby realizing the ice-breaking unlocking of the car door. The working process of the door lock assembly 200 is stable and reliable, and the structure of the door lock assembly 200 is simple with fewer components, which is beneficial for reducing costs and thus improving the overall performance of the vehicle 300.

In the description of the present application, it is necessary to understand that the terms "center", "longitudinal", "transverse", "length", "width", "thickness", "up", "down", "front", "rear", "left", "right", "vertical", "horizontal", "top", "bottom", "inside", "outside", "clockwise", "counter-clockwise", "axial", "radial", "circumferential", etc. indicating the orientation or positional relationship are based on the orientation or positional relationship shown in the accompanying drawings, which are for the purpose of facilitating the description of the present application and simplifying the description, and do not indicate or imply that the indicated device or element must have an orientation or be constructed and operated in an orientation. Therefore, it should not be understood as a limitation on the present application.

In addition, the terms "first" and "second" are used for descriptive purposes and should not be understood as indicating or implying relative importance or implicitly indicating the number of the technical features specified. Accordingly, the features qualified by "first" and "second" may explicitly or implicitly include one or more of such features. In the description of the present application, the meaning of "multiple" is two or more, unless otherwise explicitly and limited.

In the present application, unless otherwise explicitly specified and limited, terms such as "installed", "connected", "coupled", "fixed", etc. should be broadly interpreted. For example, it can be a fixed connection, or it can be a detachable connection, or it can be integrated as a whole; it can be a mechanical connection, or it can be an electrical connection; it can be a direct connection, or it can be an indirect connection through an intermediate medium, and it can be the internal connection between two elements or the interactive relationship between two elements. For a person of ordinary skill in the art, the meaning of the above terms in the present application can be understood based on the situation.

In the present application, unless otherwise explicitly specified and limited, the first feature being "on" or "under" the second feature can mean that the first and second features are in direct contact, or the first and second features are in indirect contact through an intermediate medium. Moreover, the first feature being "above", "upper", and "on" the second feature can mean that the first feature is directly above or diagonally above the second feature, or it merely indicates that the horizontal height of the first feature is higher than the second feature. The first feature being "below", "under", and "beneath" the second feature can mean that the first feature is directly below or diagonally below the second feature, or it merely indicates that the horizontal height of the first feature is lower than the second feature.

In the description of this specification, the references to terms such as "an embodiment", "some embodiments", "example", "specific example", or "some examples" indicate that the features, structures, materials or characteristics described in conjunction with that embodiment or example are included in at least one embodiment or example of the present application. The illustrative references to these terms in the specification do not necessarily refer to the same embodiment or example. Moreover, the described features, structures, materials or characteristics can be combined in an appropriate manner in one or more embodiments or examples. Furthermore, in the absence of conflicts, a person of ordinary skill in the art can combine and integrate the different embodiments or examples and the features of the different embodiments or examples described in this specification.

Although embodiments of the present application have been shown and described above, it should be understood that these embodiments are examples, and should not be construed as limiting the scope of the present application. A person of ordinary skill in the art can vary, modify, substitute and transform the above embodiments within the scope of the present application.

What is claimed is:

1. An actuator, comprising:

a housing having a cable outlet;

a driver disposed inside the housing;

an output rotor configured to be driven to rotate forward or backward by the driver, the output rotor having a fitting part; and a first cable and a second cable, a first end of the first cable and a first end of the second cable fitting to the fitting part, a second end of the first cable and a second end of the second cable extending out of the housing through the cable outlet, the output rotor configured to rotate forward to drive the first cable through the fitting part, and the output rotor configured to rotate backward to drive the second cable through the fitting part, wherein the output rotor comprises a groove extending along a rotation direction of the output rotor, the fitting part is defined by the groove, the first end of the first cable is inserted into the groove and in contact with a first end surface of the groove, and the second cable is inserted into the groove and in contact with a second end surface of the groove.

2. The actuator according to claim 1, wherein in the rotation direction of the output rotor, cable spaces are disposed on both sides of the fitting part; and a side wall of the fitting part comprises a through-hole, the through-hole extends along the rotation direction of the output rotor, each of the cable spaces is in communication with the fitting part through the through-hole, and the first cable and the second cable extend out of the output rotor through the through-hole and the cable space.

3. The actuator according to claim 1, wherein the housing comprises a cable routing slot, the first cable and/or the second cable passes through the cable routing slot and extends toward the cable outlet.

4. The actuator according to claim 3, wherein the housing comprises a first housing and a second housing, the first housing and the second housing are configured to define an installation space, and the driver and the output rotor are disposed in the installation space.

5. The actuator according to claim 4, wherein the first housing comprises the cable routing slot, a first side of the cable routing slot is open towards the second housing, the second housing comprises a stop rib, and the stop rib is located on the first side of the cable routing slot.

6. The actuator according to claim 1, further comprising a match gear set comprising an input gear and an output gear, wherein the driver drives the input gear to rotate, and the output gear is configured to engage with the output rotor to drive the output rotor to rotate.

7. The actuator according to claim 6, wherein the driver comprises a motor, a rotation axis of a motor shaft of the motor is at an angle with a center axis of the input gear, and the motor shaft has external threads engaging with the input gear.

8. The actuator according to claim 1, wherein each of the first end of the first cable and the first end of the second cable is configured as a cylindrical body, and a diameter of the cylindrical body is equal to or less than a width of the groove.

* * * * *